(12) United States Patent
Young et al.

(10) Patent No.: US 8,818,356 B2
(45) Date of Patent: Aug. 26, 2014

(54) METHODS AND APPARATUS FOR HANDLING MEASUREMENT REPORTS

(75) Inventors: Gordon Peter Young, Shipston-on-Stour (GB); Anthony Tod, Waterloo (CA); Ajay Singh, Waterloo (CA); Richard Charles Burbidge, Hook (GB); Takashi Suzuki, Chiba (JP); Claude Jean-Frederic Arzelier, Cannes (FR)

(73) Assignee: BlackBerry Limited, Waterloo, Ontario (CA)

( * ) Notice: Subject to any disclaimer, the term of this patent is extended or adjusted under 35 U.S.C. 154(b) by 485 days.

(21) Appl. No.: 12/770,585

(22) Filed: Apr. 29, 2010

(65) Prior Publication Data
US 2010/0279679 A1 Nov. 4, 2010

Related U.S. Application Data

(60) Provisional application No. 61/174,920, filed on May 1, 2009.

(51) Int. Cl.
| H04W 24/00 | (2009.01) |
| H04W 36/00 | (2009.01) |
| H04W 72/00 | (2009.01) |
| H04W 4/00 | (2009.01) |
| H04B 7/216 | (2006.01) |
| H04W 36/18 | (2009.01) |

(52) U.S. Cl.
CPC ......... *H04W 36/0083* (2013.01); *H04W 36/18* (2013.01)
USPC ........ 455/423; 455/436; 455/442; 455/452.2; 370/331; 370/332; 370/333; 370/335; 370/350

(58) Field of Classification Search
CPC ..... H04W 24/10; H04W 24/02; H04W 24/00; H04W 36/20

USPC ............................ 455/423, 436, 442, 452.2; 370/331–332, 335, 342, 350
See application file for complete search history.

(56) References Cited

U.S. PATENT DOCUMENTS 5,999,816 A * 12/1999 Tiedemann et al. .......... 455/437
8,144,664 B2 * 3/2012 Pani et al. ..................... 370/331
(Continued)

FOREIGN PATENT DOCUMENTS

WO 9857512 A1 12/1998

OTHER PUBLICATIONS

Infineon Technologies; 3GPP TSG-RAN WG2 Meeting #66; Title: Improvements to Measurement Reporting; R2-092887; San Francisco, USA; May 4-8, 2009; 3 pgs.

(Continued)

*Primary Examiner* — Inder Mehra
(74) *Attorney, Agent, or Firm* — Conley Rose, P.C.; Maria L. Sekul; J. Robert Brown, Jr.

(57) ABSTRACT

A network comprising a component configured to update an active set (AS) of cells based on a collective consideration of a plurality of cell measurement reports received during radio reconfiguration. Also included is a user equipment (UE), comprising a component configured such that the UE combines a plurality of cell measurement reports triggered briefly before and/or during radio reconfiguration, the combined measurement report used to update an AS of cells. Also included is a method comprising transmitting a radio bearer reconfiguration message, receiving a plurality of cell measurement reports, receiving a radio bearer reconfiguration complete message, and updating a plurality of AS cells using the combined cell measurement reports. Also included is a method comprising receiving a radio bearer reconfiguration message, obtaining a plurality of cell measurement reports, and sending a combined cell measurement report based on the cell measurement reports.

20 Claims, 6 Drawing Sheets

(56) References Cited

U.S. PATENT DOCUMENTS

| | | | |
|---|---|---|---|
| 2004/0166862 A1* | 8/2004 | Voyer | 455/446 |
| 2004/0259547 A1 | 12/2004 | Lau et al. | |
| 2005/0063339 A1* | 3/2005 | Jeong et al. | 370/331 |
| 2005/0070274 A1* | 3/2005 | Pedlar et al. | 455/432.1 |
| 2007/0109986 A1 | 5/2007 | Kwak et al. | |
| 2007/0258384 A1 | 11/2007 | Sammour et al. | |
| 2010/0015985 A1* | 1/2010 | Chang et al. | 455/442 |
| 2010/0203887 A1* | 8/2010 | Kim | 455/434 |
| 2011/0110300 A1* | 5/2011 | Sachs et al. | 370/328 |
| 2012/0120898 A1* | 5/2012 | Nickisch | 370/329 |

OTHER PUBLICATIONS

3GPP TR 36.814 v0.4.1; 3rd Generation Partnership Project; Technical Specification Group Radio Access Network; Further Advancements for E-UTRA Physical Layer Aspects; Release 9; Feb. 2009; 31 pgs.

3GPP TS 25.331 v6.20.0; 3rd Generation Partnership Project; Technical Specification Group Radio Access Network; Radio Resource Control (RRC); Protocol Specification; Release 6; Dec. 2008; 1251 pgs.

3GPP TS 36.331 v8.4.0; 3rd Generation Partnership Project; Technical Specification Group Radio Access Network; Evolved Universal Terrestrial Radio Access (E-UTRA) Radio Resource Control (RRC); Protocol Specification; Release 8; Dec. 2008; 198 pgs.

PCT Invitation to Pay Additional Fees (Partial Search Report); PCT Application No. PCT/GB2010/000881; Aug. 25, 2010; 4 pgs.

PCT International Search Report; PCT Application No. PCT/GB2010/000881; Oct. 25, 2010; 6 pgs.

PCT Written Opinion of the International Searching Authority; PCT/GB2010/000881; Oct. 25, 2010; 6 pgs.

* cited by examiner

METHODS AND APPARATUS FOR HANDLING MEASUREMENT REPORTS

CROSS-REFERENCE TO RELATED APPLICATIONS

The present application claims priority to U.S. provisional patent application No. 61/174,920 filed May 1, 2009, by Gordon Young, et al, entitled "Method to Improve Third Generation (3G) Radio Integrity for Mobility Procedures During Blocking Network Procedures", which is incorporated by reference herein as if reproduced in its entirety.

BACKGROUND

As used herein, the terms "user equipment" and "UE" might in some cases refer to mobile devices such as mobile telephones, personal digital assistants, handheld or laptop computers, and similar devices that have telecommunications capabilities. Such a UE might consist of a UE and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might consist of the device itself without such a module. In other cases, the term "UE" might refer to devices that have similar capabilities but that are not transportable, such as desktop computers, set-top boxes, or network appliances. The term "UE" can also refer to any hardware or software component that can terminate a communication session for a user. Also, the terms "UE," "user equipment," "UA (User Agent)," "user device", and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an enhanced node B (eNB), a wireless access point, or a similar component rather than a traditional base station. As used herein, the term "access node" will refer to any component of the wireless network, such as a traditional base station, a wireless access point, or an LTE eNB, that creates a geographical area of reception and transmission coverage allowing a UE or a relay node to access other components in a telecommunications system. In this document, the term "access node" may comprise a plurality of hardware and software. An access node, core network component, or other device, may provide wireless communications resources in an area known as a cell.

An LTE system can include protocols such as a Radio Resource Control (RRC) protocol, which is responsible for the assignment, configuration, and release of radio resources between a UE and an access node or relay node or other LTE equipment. The RRC protocol is described in detail in the Third Generation Partnership Project (3GPP) Technical Specification (TS) 36.331.

The signals that carry data between UEs, relay nodes, and access nodes can have frequency, time, and coding parameters and other characteristics that might be specified by a network node. A connection between any of these elements that has a specific set of such characteristics can be referred to as a resource. The terms "resource," "communications connection," "channel," and "communications link" might be used synonymously herein. A network node typically establishes a different resource for each UE or other network node with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
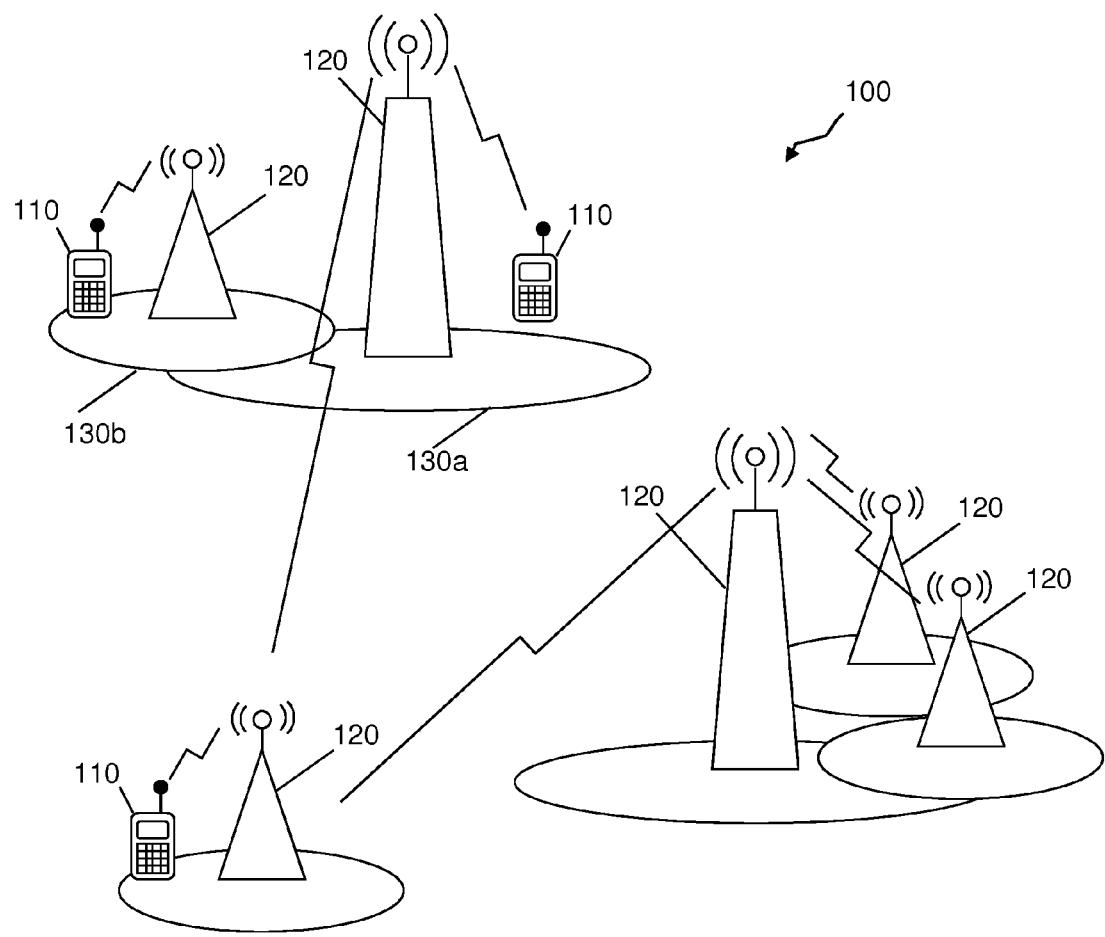
FIG. 1 is a diagram illustrating a wireless communication system according to an embodiment of the disclosure.

FIG. 1 illustrates an embodiment of a wireless communication system 100, for instance as described in the 3GPP. FIG. 1 is exemplary and may have other components or arrangements in other embodiments. The wireless communication system 100 may comprise at least one UE 110 and at least one access node 120. The wireless communication system 100 may be part of a wireless network such as a Universal Mobile Telecommunications System (UMTS) terrestrial Radio Access Network (UTRAN) or evolved UTRAN (E-UTRAN). The UE 110 may wirelessly communicate, via a wireless link, with the network access node 120. The wireless link may conform to any of a plurality of telecommunications standards or initiatives, such as those described in the 3GPP, including LTE, GSM, GPRS/EDGE, High Speed Packet Access (HSPA), and UMTS. Additionally or alternatively, the wireless link may conform to any of a plurality of standards described in the 3GPP2, including Interim Standard 95 (IS-95), Code Division Multiple Access (CDMA) 2000 standards 1xRTT or 1xEV-DO. The wireless link may also be compatible with other standards, such as those described by the Institute of Electrical and Electronics Engineers (IEEE), or other industry forums, such as the WiMAX forum.

The access node 120 may be a Node B, an eNB, a base station, or other components that promote network access for the UE 110. The access node 120 may communicate with any UE 110, which may be within the same cell, such as a cell 130a or a cell 130b, directly via a direct link. For instance, the direct link may be a point-to-point link established between the access node 120 and the UE 110 and used to transmit and receive signals between the two. The UE 110 may also communicate with at least a second UE 110 within the same cell.

The UE 110 and the access node 120 may wirelessly communicate via at least one downlink (DL) channel, at least one uplink (UL) channel, or both. The downlink and uplink channels may be physical channels, which may be statically, semi-statically, or dynamically allocated network resources. For instance, the downlink and uplink channels may comprise at least one physical downlink dedicated channel (PDDCH), at least one physical downlink control channel (PDCCH), at least one physical uplink dedicated channel (PUDCH), at least one physical uplink control channel (PUCCH), or combinations thereof. In an embodiment, the downlink and uplink channels may be established using frequency-division duplexing (FDD), where signals are received and transmitted at different frequencies. Additionally or alternatively, the downlink and uplink channels may be established using time-division, where the signals may be transmitted, received, or both at different transmission time intervals (TTIs).

Additionally, the access node 120 may communicate with other components or devices to provide for the components of the wireless communication system 100 access to other networks. Such networks may include packet data networks PDNs, which may be Internet-based, such as Internet Packet (IP) networks. As such, the access node 120 may provide the UE 110 packet-based data and/or services, such as World Wide Web pages, multimedia broadcast/multicast services, and other data packet-based services. To access the PDNs, the UE 110 may one or more radio bearer connections with an access node 120. For example, the UE 110 may use a first radio bearer to connect to a first PDN to access the World Wide Web and use a second radio bearer to connect to a second PDN to access a video download. The use of such concurrent bearers may allow the user to quickly switch between the two PDNs. The radio bearers may conform to a set of QoS requirements for the UE 110, such as a guaranteed bit rate, a maximum bit rate, a packet delay budget, a packet loss rate, and other parameters of data transfer quality. The radio bearers assigned to the UE 110 may be reconfigured, for instance at the UE 110 due to changes in QoS or to improve network traffic.

In an embodiment, when the UE 110 is located in a plurality of cells, e.g. cells 130a and 130b, the UE 110 may communicate with at least one of the access nodes 120 of the cells, which may be one of the Active Set (AS) cells for the UE 110. The AS cells may be selected by the network based on cell measurements from the UE 110 and may have the best or suitable signal quality and/or strength for communications. The UE 110 may perform the cell measurements for a plurality of cells, which may include the AS cells and other neighboring cells detected by the UE 110. The UE 110 may detect the neighboring cells using a "blind search" procedure, where the UE 110 may search for a resource of a network, or for a particular access node or base station, without having prior identification or knowledge of the existence of such a network, access node, or base station. The UE 110 may obtain and forward the cell measurements for the cells to the network, receive an updated AS from the network, and communicate with the updated AS cells instead of the previous set of active cells. For example, the UE 110 may be initially connected to the access node 120 in the cell 130a, which maybe in the AS, forward the cell measurements for the cells 130a and 130b to the network, and obtain an updated AS from the network that includes the cell 130b and removes the cell 130a.

Hence, the UE 110 may reselect the cell 130b, e.g. connect the access node 120 of the cell 130b instead of the cell 130a.

The UE 110 may be configured by the network (e.g. the UTRAN) to perform the cell measurements, which may be intra-frequency measurements, inter-frequency measurements, and/or inter-Radio Access Technology (RAT) measurements. The cell measurements may include quality (Ec/No) measurements of a primary common pilot channel (P-CPICH), received signal code power (RSCP) measurements of a P-CPICH, and/or other signal measurements in the cells. The network may configure the UE 110 to report the cell measurements in response to measurement reporting events. The measurement reporting events may include an intra-frequency reporting event where a P-CPICH enters a reporting range (event 1A), an intra-frequency reporting event where a P-CPICH leaves the reporting range (event 1B), an intra-frequency reporting event where a non-active P-CPICH becomes better than an active P-CPICH for communications (event 1C), and/or other frequency reporting events. Additionally, other measurement events may be configured as described in 3GPP specification TS 25.331.

Upon detecting a measurement reporting event, the UE 110 may send a corresponding measurement report to the network, for instance to the access node 120. The network may receive the cell measurement report and subsequently triggered measurement reports from the UE 110 and process the cell measurement reports in the sequence received to update the AS cells. However, in some cases, the network may delay the processing of the cell measurement reports, for instance during the radio bearer reconfiguration, and similarly during radio bearer setup, radio bearer release, transport channel reconfiguration, or physical channel reconfiguration. During the reconfiguration, the network may be "locked" and may not process the received cell measurement reports until the reconfiguration is completed. However, the network may still receive the cell measurement reports from the UE 110, for instance via RRC signaling over the uplink during the reconfiguration, without processing the cell measurement reports. Accordingly, the network may queue the unprocessed cell measurement reports in the order received and process the cell measurement reports when the reconfiguration is completed.

When the network processes the queued and delayed cell measurement reports to update the AS cells, one report at a time, the network may send the updated AS to the UE 110, which may include at least one cell that does not have suitable signal quality and/or strength due to outdated cell measurements. The updated AS may include one cell that has low signal quality and/or strength as currently measured by the UE 110. Thus, when the UE 110 communicates with that cell, undesirable communication blackouts or call drops may occur. The call drops or communication failures may further increase in the case of multiple radio access bearer configurations, where the UE 110 may establish both circuit switched (CS) and packet switched (PS) communications in the network. Additionally or alternatively, the updated AS may not comprise at least one cell that has suitable signal quality and/or strength, which may reduce the communications performance and optimization in the system.

Figure 2:
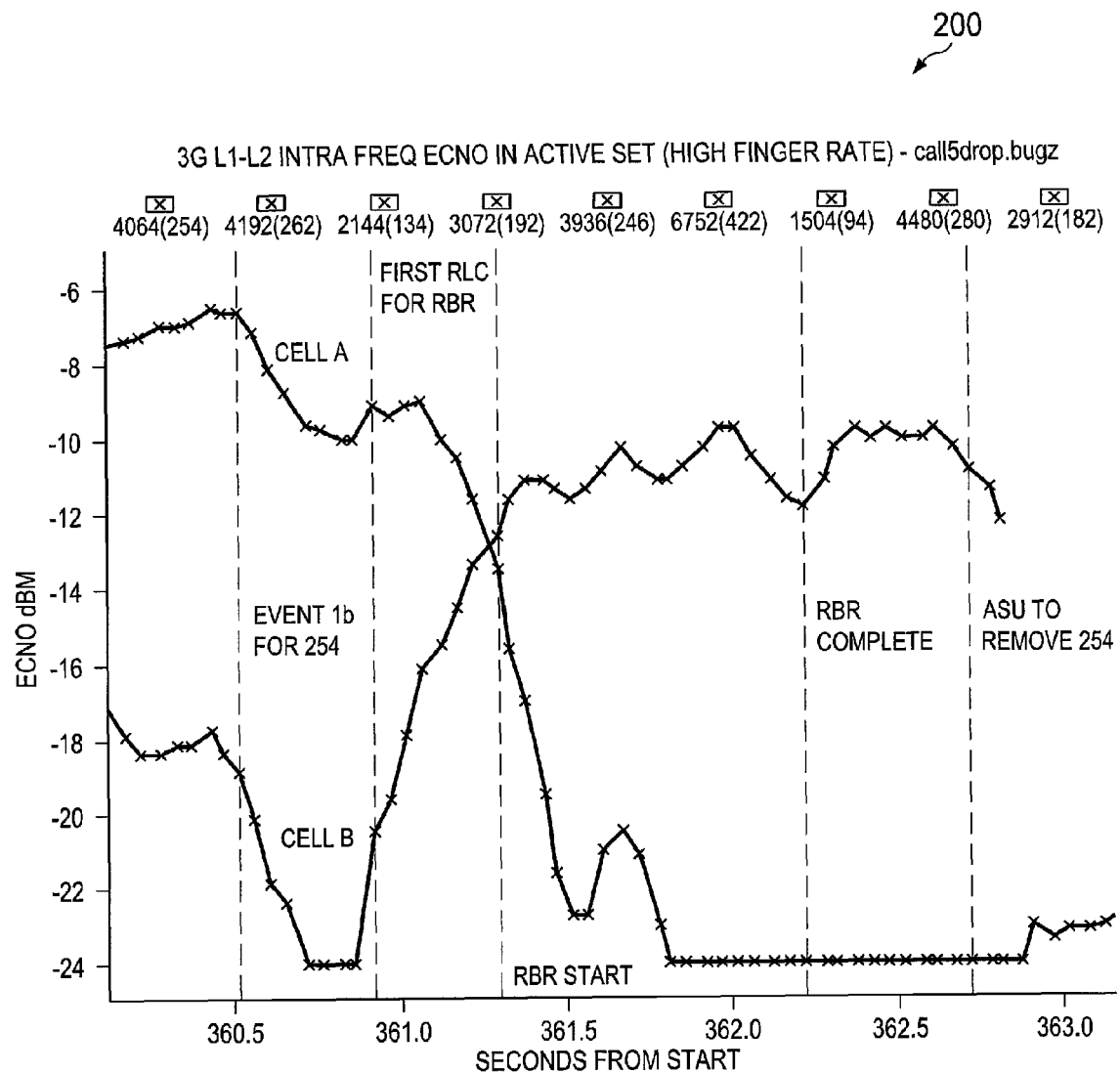
FIG. 2 is a chart of cell measurements according to an embodiment of the disclosure.

FIG. 2 illustrates an embodiment of cell measurements 200, which may be obtained by the UE 110 for two cells; Cell A and Cell B, in a UTRAN. The two cells may be initially AS cells, where the UE 110 may establish a handover procedure for a CS connection. The UE 110 may perform the cell measurements for the two cells over a time period. Specifically, the network may initiate a radio bearer reconfiguration by sending a radio bearer reconfiguration message to the UE 110. As a result, the network may be locked and processing of the cell measurement reports may be delayed. Before the network is locked, the UE 110 also sends a first cell measurement report for Cell B upon detecting an event 1B, which may indicate a decrease in signal strength of Cell B.

During the radio bearer reconfiguration, the network may be locked, where mobility processing for the UE 110 including updating the AS cells may be paused. Accordingly, during the reconfiguration process, the network may not process reports or events from the UE 110 in order to maintain synchronization between the various network components. The network receives the first cell measurement report for Cell B after being locked, and consequently stores the first cell measurement report for Cell B in a queue. Further, during the reconfiguration, the network radio conditions vary significantly, where the signal strength for Cell B increases and the signal strength for Cell A decreases. Thus, the UE 110 sends a second cell measurement report for Cell B upon detecting an event 1D and a third cell measurement report for Cell A upon detecting an event 1B. Since, the network is locked, the network receives the second cell measurement report for Cell B and the third cell measurement report for Cell A and stores them in sequence in the queue.

When the radio bearer reconfiguration is completed, the network is informed by the UE 110 of completing reconfiguration using a radio bearer reconfiguration complete message, and hence the network is activated and may resume mobility processing. As shown in FIG. 2, the network receives the radio bearer reconfiguration complete message (RBR (Radio Bearer Reconfiguration message) complete) after about 1.3 seconds from receiving the radio bearer reconfiguration message, which may be indicated by an acknowledgement of an acknowledged mode radio link control message (AM RLC (Radio Link Control) ack) (First RLC for RBR).

Typically, if the network begins processing the queued cell measurement reports in sequence, the network may process the first cell measurement report for Cell B, as triggered by the measurement event 1B, update the AS by deleting the radio link for Cell B from the AS, and update the AS cells including Cell A by sending the UE 110 an AS update message. Consequently, the UE 110 may communicate with Cell A to establish a call, which may then fail since Cell A has a substantially low signal at this point. To resume reliable communications with the network, the UE 110 may have to wait until the network processes the second cell measurement report for Cell B in the queue and send the UE 110 an updated AS including Cell B. However, if the signal of Cell A is too low, the UE 110 may not receive this attempt at recovering the communications, and the call may still fail.

Figure 3:
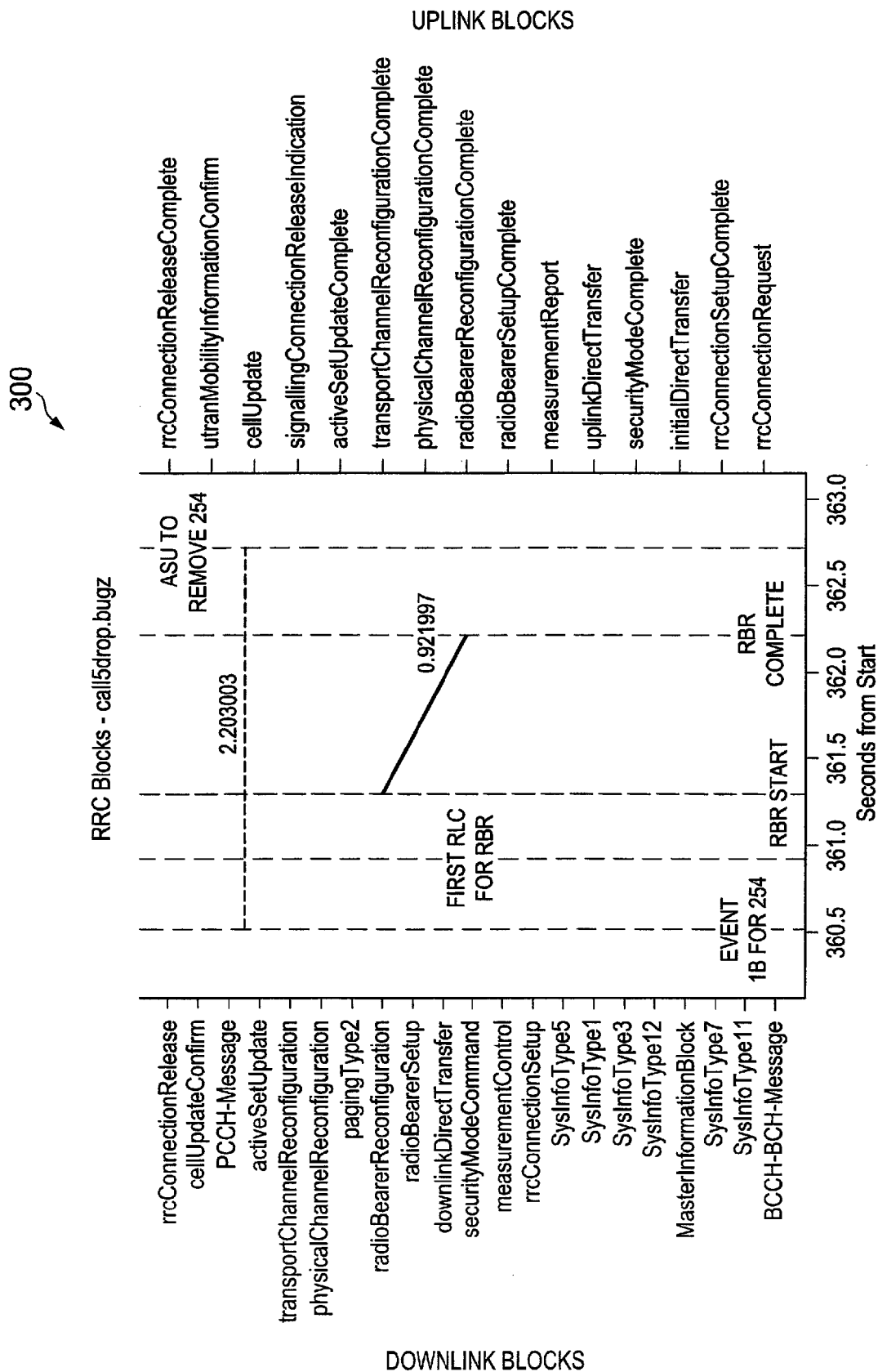
FIG. 3 is a chart of active set update delay according to an embodiment of the disclosure.

FIG. 3 illustrates an embodiment of an AS update delay 300, which may cause a call failure or communication blackout. The AS update delay corresponds to the time delay between receiving the first cell measurement report for Cell B upon detecting the event 1B (event 1b for 254) and updating the AS based on processing the first cell measurement report for Cell B (ASU (Active Set Update) to remove 254). As shown in FIG. 3, the AS update delay is greater than about 2.2 seconds, which may be enough time for significant changes in the network radio conditions at Cell B to take place. As the number of triggering events increases before and during reconfiguration, the number of queued reports may increase and the delay to update the AS may also increase for all the respective measurement reports as sequentially processed. Consequently, processing the delayed and queued cell measurement reports in sequence according to the order they are received and queued may not be tolerated.

Disclosed herein are methods and systems for avoiding or reducing AS updates based on outdated cell measurement reports, which may limit call failures or drops. The cell measurement reports received when the network is locked may be batched and processed after the reconfiguration procedure when the network is activated, or combined during reconfiguration and then processed when the network is activated after reconfiguration. A plurality of embodiments are disclosed herein and described below to regarding processing cell measurements or reports jointly, such as in batch form, or otherwise instead of sequentially, any such analysis or processing of these measurement reports may be referred to herein as collective consideration of the measurements or reports. As such, the most updated cell measurements, e.g. corresponding to the latest updated measurement or reports, may be processed for each cell and/or each event, and the outdated cell measurements previously obtained may be deleted or discarded. Hence, upon completing the reconfiguration process, the network may send the UE 110 an AS with reduced update delays and based on more recent signal conditions.

Figure 4:
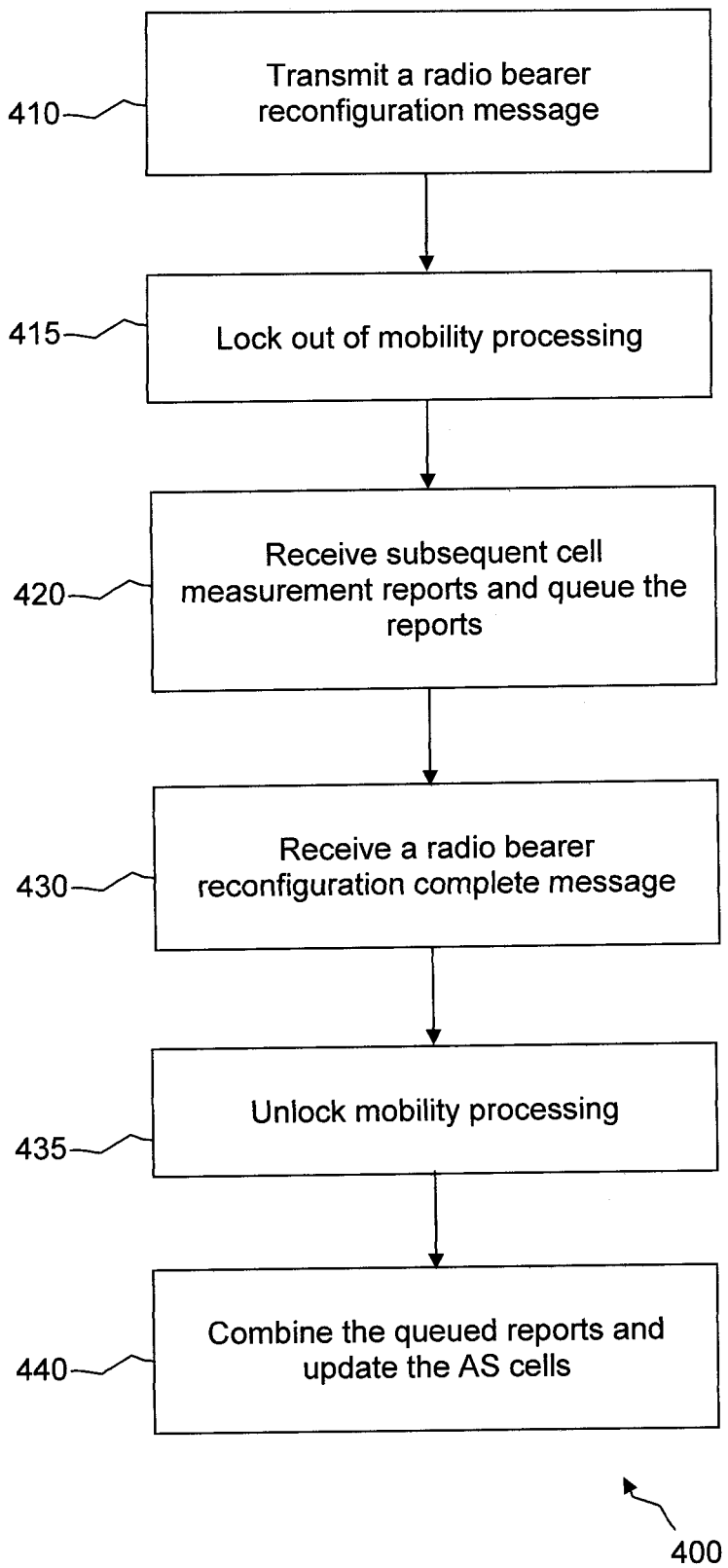
FIG. 4 is a flowchart of a mobility procedure for updating active set cells according to an embodiment of the disclosure.

FIG. 4 illustrates an embodiment of a mobility procedure 400 for updating the AS cells using joint cell measurement reports. Specifically, the network may receive and queue a plurality of cell measurement reports during reconfiguration, combine the cell measurement reports, and then process the combined reports after completing the reconfiguration. The received reports may comprise cell measurements obtained and transmitted by the UE 110 before initiating the reconfiguration process and during the reconfiguration process. However, the cell measurements transmitted before initiating the reconfiguration process may be obtained and sent briefly before reconfiguration, and hence may be received by the network after the network is locked, e.g. after the network transmits a radio bearer reconfiguration message.

At block 410, the network may transmit to the UE 110 a radio bearer reconfiguration message, for instance via the access node 120. Accordingly, at block 415, the network may lock out or deactivate mobility processing, and halt processing the received cell measurement reports. The network may also stop sending AS update messages to the UE 110. At block 420, the network may receive subsequent cell measurement reports and queue the reports in the order received. At block 430, the network may receive a radio bearer reconfiguration complete message from the UE 110. Hence, at block 435, the network may unlock mobility processing. At block 440, the network may combine the queued cell measurement reports, process the combined reports to obtain the latest cell measurements for the various cells and/or events, and update the AS with the cells having the strongest cell measurements or signals. The network may send to the UE 110 the AS cells using an AS update message. In an alternative embodiment, when the network is locked during the reconfiguration procedure, the network may receive each cell measurement report in turn and use the received report to update a stored combined report instead of queuing every received measurement report. As such, the network may process the combined reports more quickly upon completing the reconfiguration.

In an embodiment, the radio bearer reconfiguration complete message from the UE 110 may comprise cell measurements, such as a list of intra frequency-measurements for the AS cells or monitored cells. The list may include the latest CPICH Ec/No, CPICH RSCP, or path loss for the AS cells according to the measurement quantity indicated by the network. The list may be sent in the radio bearer reconfiguration complete message when some measurement events are generated during the reconfiguration procedure. The list may indicate to the network to combine the cell measurement reports transmitted briefly before and during the reconfiguration procedure (e.g. the queued reports) as well as provide the most recent radio conditions, for instance in a fast fading radio environment.

Figure 5:
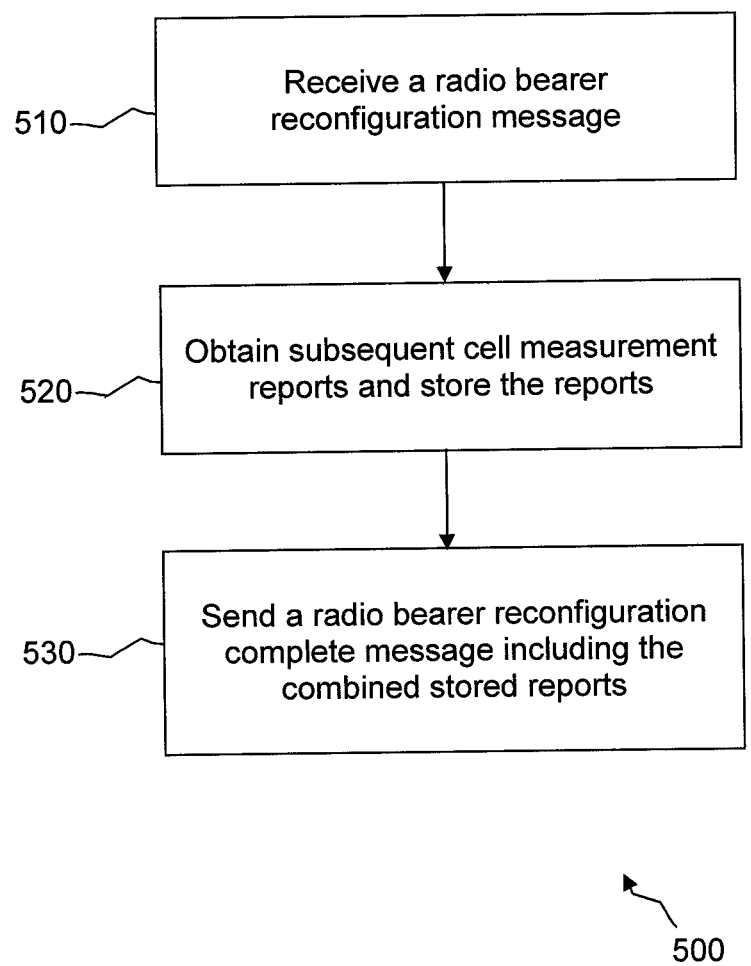
FIG. 5 is a flowchart of another mobility procedure for updating active set cells according to an embodiment of the disclosure.

FIG. 5 illustrates an embodiment of another mobility procedure 500 for updating the AS cells using joint cell measurement reports. Specifically, the UE 110 may combine a plurality of cell measurement reports obtained during reconfiguration and send the combined reports to the network during and/or after completing the reconfiguration. At block 510, the network may send to the UE 110 a radio bearer reconfiguration message, for instance via the access node 120. Accordingly, the network may be locked, deactivate mobility processing, and halt processing the received cell measurement reports. The network may also stop sending AS update messages to the UE 110. At block 520, the UE 110 may obtain subsequent cell measurement reports based on triggered cell measurement events, send the reports to the network and store the reports in the order obtained. Alternatively, the UE 110 may store the reports without sending the reports to the network. At block 530, the UE 110 may send to the network a radio bearer reconfiguration complete message, and hence the network may be unlocked and the mobility processing may be activated. The UE 110 may combine the queued cell measurement reports and send the combined reports to the network, for instance in the radio bearer reconfiguration complete message, where they may be processed and used to update any reports queued at the network. Hence, the UE 110 may receive an AS update message from the network comprising the AS cells according to the latest radio conditions.

In the case where the UE 110 transmits the cell measurement reports to the network as they are obtained during the reconfiguration, a report triggered for a cell by an event briefly before reconfiguration may be received by the network after reconfiguration and may be queued. Accordingly, when the network receives the combined report in the radio bearer reconfiguration complete message, the network may delete the queued report, update the queued report, or replace it with the updated report in the message for the same event and/or cell. As such, the network may start mobility processing after predetermined delay from completing reconfiguration, to ensure receiving a complete measurement report update from the UE 110. Alternatively the UE 110 may report N pf the better cells attached to the reconfiguration complete message. The better cells may be selected according to the latest measurements, for instance during M measurement periods. For example, N may be configured to 3 and M may be preconfigured to 2.

In an alternative embodiment, to further reduce AS update delays, the UE 110 may combine the cell measurements substantially in real time, for instance by updating a combined report upon each cell event instead of storing the reports and combining them after reconfiguration. In another embodiment, the UE 110 may keep records of the cell measurements for each event during reconfiguration, which may be processed at the UE 110 to obtain a list of active cells, as may be expected from the network. In some cases, the network may be a legacy network, which may not be configured to process the combined and updated report from the UE 110 after reconfiguration, and hence may ignore such information the radio bearer reconfiguration complete message.

In an embodiment, the UE 110 may send the combined cell measurement reports using a predictive AS indication in a separate message after the sending the radio bearer reconfiguration complete message. The message comprising the combined report may also comprise an indication that is it is an emergency measurement report which should be handled and processed instead of or in combination with the pending measurement reports stored in the network. Thus, the network may detect the emergency report indication as a special or priority report and replace or update any pending reports at the network. The network may wait after reconfiguration and before resuming mobility processing for predetermined delay, which may be sufficient for the network to detect the combined report message.

In an embodiment, when the UE 110 receives the AS update message from the network after reconfiguration and AS update, the UE 110 may reject the AS cells in the message. For instance, the received AS cells may not be updated based on the latest radio conditions known to the UE 110, such as when a cell with relatively good signal conditions based on the current cell measurements or based on the combined reports of the UE 110 is deleted from the updated AS. Consequently, the UE 110 may send a reject message to the network to reject the received AS update message. The reject message may comprise the latest radio conditions for the UE 110, an updated AS cells from the UE 110 based on the latest radio conditions or at least an indication of the current best cell to prevent an ongoing call from dropping. Additionally or alternatively, the reject message may comprise the latest updated and combined measurement reports from the UE 110.

The conditions for the UE 110 to reject the AS update message may be predefined. For example, the UE 110 may reject the update AS cells when all the cells in the AS or new resulting AS have a signal strength or quality lower than a predetermined threshold, for instance by the network. The signal strength or quality may be evaluated based on received signal strength indicator (RSCP), Ec/No, and/or frequency quality estimate. The UE 110 may reject the AS update if the RSCP, Ec/No, and frequency quality estimate are lower than their corresponding threshold parameters, if either one of the three is lower than its corresponding threshold parameter, or if two of the three are lower than their corresponding threshold parameters. Alternatively, the UE 110 may reject the AS update if an average (or weighted average) between the two or three parameters is lower than a corresponding threshold. The threshold parameters for the RSCP, Ec/No, frequency quality estimate, and/or the weights corresponding to the weighted average may be sent to the UE 110 by the network using a broadcast System Information or dedicated RRC signaling.

In another embodiment, the UE 110 may reject the AS update message if the average (or weighted average) signal strength or quality of the cells in the AS or new resulting AS is lower than threshold(s), for instance predetermined by the network. The weights corresponding to the weighted average may be sent to the UE 110 by the network using a broadcast System Information or dedicated RRC signaling.

In some cases, the UE 110 may send the reject message comprising the updated AS cells or the combined measurement reports even when the UE 110 receives from the network a valid AS after reconfiguration, e.g. which comprises no cells having low signals. The reject message may be sent in anticipation of any pending reports at the network, which may result in subsequent AS updates that may not be valid. In some embodiments, upon receiving an updated AS from the network that includes an invalid cell, the UE 110 may send an more recently updated AS or a combined measurement report to the network using an AS update failure message to update the network of the UE 110 current radio condition or AS.

In another embodiment, the UE 110 may ignore any received AS update message from the network, for instance where a radio link corresponding to a cell is deleted, for a period of time until the network complete processing all pending reports. Hence, if the UE 110 receives a subsequent AS update message including the deleted link, the UE 110 may ignore all the previously received AS update messages that exclude the link. However, in this case the network may stop sending data over the link during the time between the AS update messages. As such, if the deleted link is the only active radio link during that time, the UE 110 may not receive the last AS update message that include the previously deleted link.

In an embodiment, the UE 110 may use 'event triggered periodic measurement reporting' for event 1B, which is described in 3GPP TS 25.331. Accordingly, the UE 110 may initiate a first cell measurement report when the conditions for event 1B are met for a radio link in a cell, e.g. when the quality of the radio link degrades and the link leaves the reporting range. The UE 110 may then send a second cell measurement report for the same event after a predetermined period or reporting interval, e.g. after about 500 microseconds or about one millisecond. The UE 110 may continue sending cell measurement reports for the same event over a plurality of periods or reporting intervals until a predetermined maximum number of reports is reached. Alternatively, the UE 110 may continue sending cell measurement reports until the cell associated with the radio link is removed from the AS by the network, or the quality of the radio link improves and the condition for the event 1B is no longer met. Additionally or alternatively, the UE 110 may be configured to use 'event triggered periodic measurement reporting' for other events, e.g. event 1A, event 1C, etc.

The measurement reports corresponding to the events that are received by the network during reconfiguration (or mobility process locking) may be discarded without storing or queueing at the network. The network may then resume storing or queueing the measurement reports upon completing the reconfiguration. For example, when a first report is sent to the network to delete a link upon detecting an event 1B during reconfiguration, the network may ignore the measurement report and hence the link is not removed. If the link signal does not improve after reconfiguration, the UE 110 may send a second report to the network for the same event and the network may remove the link. Thus, the radio link removal may be delayed during reconfiguration, which may be tolerated without causing significant problems in communications. Alternatively, if the link signal improves during reconfiguration, the 'event triggered periodic measurement reporting' may be canceled and no further reports are sent. Thus, the radio link may not be deleted and as such call failures may be avoided.

In an alternative embodiment, the network may queue during reconfiguration time any received reports that are triggered by an event for a radio link. After completing reconfiguration, the network may process the queued reports, where the time of receiving each report may be examined to determine the elapsed time for each received report. If the elapsed time for a report exceeds a predetermined time limit, e.g. greater than 200 milliseconds, the network may discard the report and the event associated with the report may be considered out of date. Accordingly, if the radio link signal remains low, the UE 110 may send a new updated report to the network, for instance at a new reporting interval, and the link may be removed. Otherwise, if the radio link signal improves, the UE 110 may not send further reports for the event and the radio link is not removed.

Figure 6:
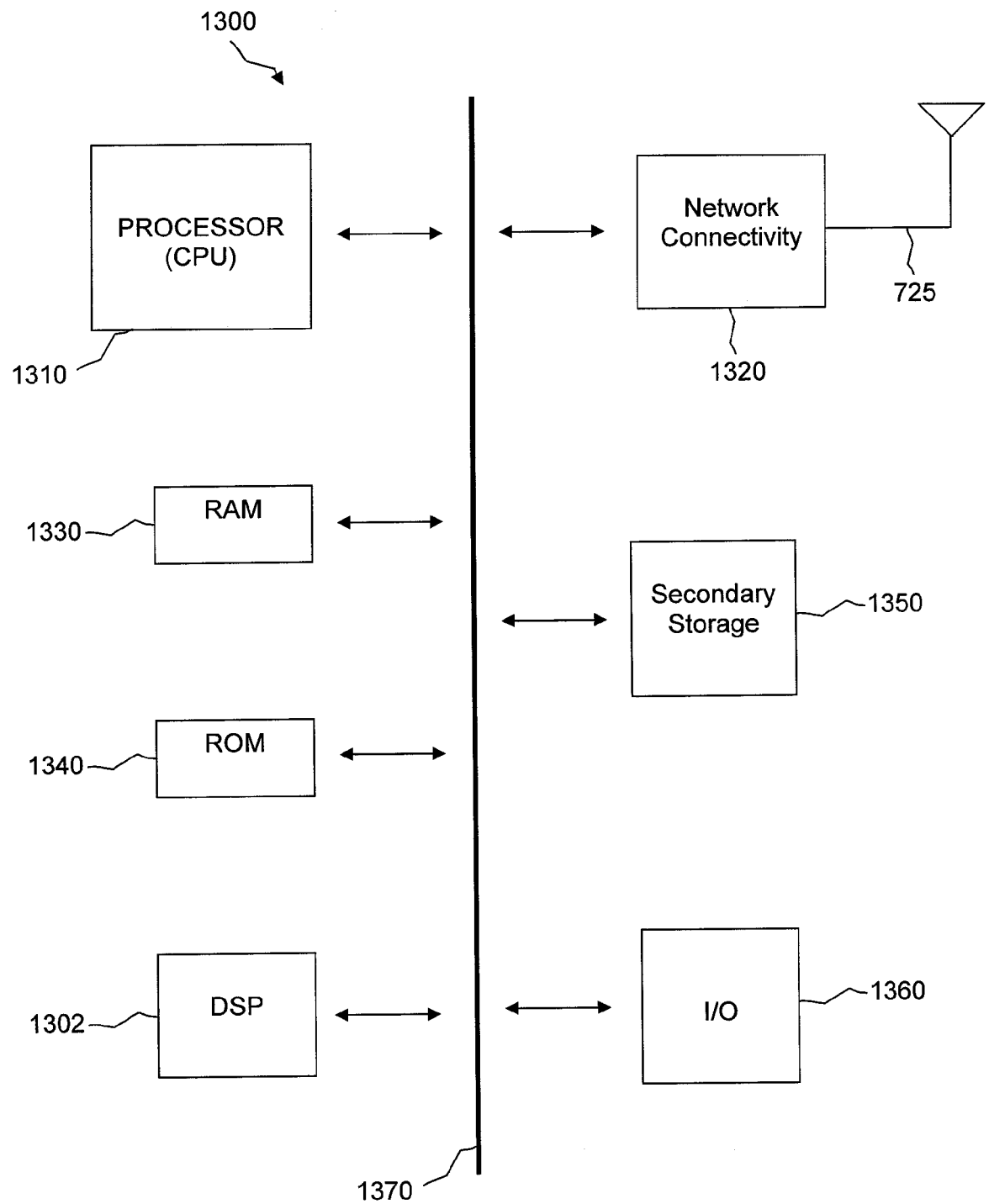
FIG. 6 illustrates a processor and related components suitable for implementing the several embodiments of the present disclosure.

The UE 110 and other components described above might include a processing component that is capable of executing instructions related to the actions described above. FIG. 6 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1302. Although the DSP 502 is shown as a separate component, the DSP 502 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information. The network connectivity devices 1320 might also include one or more transceiver components 1325 capable of transmitting and/or receiving data wirelessly.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1325 might be considered to be a component of the I/O devices 1360 instead of or in addition to being a component of the network connectivity devices 1320.

Various combinations of the components of the system 1300, including memory, hardware, firmware, software or others may be referred to herein as a "component".

The following are incorporated herein by reference for all purposes: 3rd Generation Partnership Project (3GPP) Technical Specification (TS) 36.813 and 3GPP TS 36.814. Appendix A, which is attached hereto and includes additional embodiments and disclosure, is also incorporated herein by reference for all purposes.

In an embodiment a network is provided. The network comprising a component configured to update an AS of cells based on a collective consideration of a plurality of cell measurement reports received during radio reconfiguration.

In another embodiment, a UE is provided, comprising a component configured such that the UE combines a plurality of cell measurement reports triggered briefly before and/or during radio reconfiguration (such as, for example, any time before completion of the radio reconfiguration or before transmission or reception of the reconfiguration complete message), the combined measurement report used to update an AS of cells.

In another embodiment, a method is provided, comprising receiving a radio bearer reconfiguration message, receiving a plurality of cell measurement reports, receiving a radio bearer reconfiguration complete message, and updating a plurality of AS cells using the combined cell measurement reports.

In another embodiment, a method is provided, comprising sending a radio bearer reconfiguration message, obtaining a plurality of cell measurement reports, and sending a combined cell measurement report comprising the cell measurement reports.

In another embodiment, a method is provided, comprising receiving a plurality of AS cells in an AS update message, and rejecting at least one AS cell that has a low signal strength or quality.

In another embodiment, a method is provided, comprising receiving a plurality of AS update messages that exclude a radio link before completing processing a plurality of pending cell measurement reports, and discarding the AS messages.

In another embodiment, a method is provided, comprising receiving a plurality of cell measurement reports for a triggered event at a plurality of subsequent time intervals during radio reconfiguration, and discarding at least some the cell measurement reports.

Additional embodiments are also contemplated. For example, the embodiments contemplate a network, comprising: a component configured to update an active set (AS) of cells based on a collective consideration of a plurality of cell measurement reports received during radio reconfiguration. In an embodiment, the collective consideration include cell measurement reports correspond to a plurality of cell events for at least one cell that are triggered briefly before initiating the radio reconfiguration and during the radio reconfiguration. In an embodiment, the cell events include an intra-frequency reporting event where a primary common pilot channel (P-CPICH) enters a reporting range, an intra-frequency reporting event where a P-CPICH leaves the reporting range, an intra-frequency reporting event where a non-active P-CPICH has better signal strength and/or quality than an active P-CPICH, or combinations thereof. In an embodiment, the cells are associated with a Universal Mobile Telecommunications System (UMTS) terrestrial Radio Access Network (UTRAN). In an embodiment the collective considerations include cell measurement reports that comprise cell measurements including intra-frequency measurements, inter-frequency measurements, inter-Radio Access Technology (RAT) measurements, quality (Ec/No (energy per chip versus total power)) measurements, signal code power (RSCP) measurements, path loss measurements, or combinations thereof. In an embodiment, the collective considerations include a combined cell measurement report that comprises more recently updated cell measurements than at least some of the cell measurement reports. In an embodiment, the collective considerations include combined cell measurement reports that indicate current updated radio conditions.

Other embodiments are also contemplated. One embodiment includes a method of wireless communication, comprising: transmitting a radio bearer reconfiguration message; receiving a plurality of cell measurement reports; receiving a radio bearer reconfiguration complete message; and updating a plurality of active set (AS) cells based on a collective consideration of the plurality of cell measurement reports. In another embodiment, the radio bearer reconfiguration message indicates a start of a radio bearer reconfiguration, the radio bearer reconfiguration complete message indicates the end of the radio bearer reconfiguration, and wherein the cell measurement reports are received during the radio bearer reconfiguration. In another embodiment, the cell measurement reports are and queued in sequence during the radio bearer reconfiguration and combined after the radio bearer reconfiguration. In another embodiment, the cell measurement reports are collectively considered to update the AS cells. In another embodiment, the AS cell are sent to a user agent using an AS update message after completing the radio bearer reconfiguration. In another embodiment, the AS cells are sent to a user agent that performs the radio bearer reconfiguration using an AS update message after completing the radio bearer reconfiguration. In another embodiment, the radio bearer reconfiguration complete message comprises current cell measurements. In another embodiment, the above method may further include: using the current cell measurements in combination with collective consideration including a combined cell measurement report to update the AS cells.

Still other embodiments are contemplated. In an embodiment, a method of wireless communication, comprises: receiving a plurality of active set (AS) update messages that exclude a radio link before completing processing a plurality of pending cell measurement reports; and discarding the AS messages.

In another embodiment, a method of wireless communication comprises: receiving a plurality of cell measurement reports for a triggered event at a plurality of subsequent time intervals during radio reconfiguration; and discarding at least some the cell measurement reports. In an embodiment, the cell measurement reports are sent using an event triggered periodic measurement reporting described in 3GPP specification TS 25.331. In an embodiment, the event is an event 1B described in 3GPP specification TS 25.331. In an embodiment, the cell measurement reports are sent until a predetermined maximum number of reports is reached. In an embodiment, the cell measurement reports are sent until a radio link associated with the event is removed from an active set. In an embodiment, the cell measurement reports are sent until the quality of a radio link associated with the event is improved. In another embodiment, this method further comprises: queuing the cell measurement reports; and discarding each cell measurement report that has an elapse time exceeding a predetermined time limit. In another embodiment, the time limit is greater than about 200 milliseconds.

The background, issues, and embodiments described above may be described differently. The following paragraphs represent illustrative embodiments only, and do not necessarily limit other embodiments described herein. For example, the terms "shall" or "will" might refer to a particular embodiment in which something is required; however, such an embodiment would be exemplary only and in other embodiments the term "may" could be substituted for "shall" or "will."

For example, the embodiments described herein relate to the call drop when UTRAN is acting on the Measurement reports sent by the Mobile device in a sequential manner. The issue becomes evident when the UTRAN is locked in the reconfiguration procedure, which can be due to radio bearer reconfiguration, transport channel reconfiguration or physical channel reconfiguration message. The activation time of the reconfiguration procedure can occur some time in advance of the point of time that the reconfiguration message is received, at the signaled activation time received in the reconfiguration message. During the reconfiguration procedure, uplink transmission on a signaling radio bearer used by the UE to send RRC signaling (signaling radio bearer RB1 or signaling radio bearer RB2) is allowed (spec 25.331, clause 8.2.2.2). Therefore, the mobile station can send the measurement reports which may contain different event Ids describing the current radio conditions during the radio reconfiguration procedure.

When starting the reconfiguration procedure, the UTRAN stops processing received measurement reports and stores them in sequential order, as received, for processing or acting on (sending the resulting Radio Resource Management message) in the same sequential order as received once the reconfiguration procedure is indicated as completed by the UE.

As a result, the UTRAN doesn't consider the latest Measurement Reports in its radio link addition/deletion algorithm, at the point the reconfiguration procedure is completed which may lead to the call being dropped as the radio conditions may have changed significantly during the radio reconfiguration procedure.

3GPP specification TS25.331 Radio Resource Control specification does not currently capture the handling of the uplink messages by the RNC during and after the radio reconfiguration procedure. The problem may become more pronounced and may cause a notable increase in the number of call drops in case of a multi RAB configuration (i.e. a CS+PS RAB is configured) when frequent radio reconfiguration procedures are instigated due to the addition/removal of the PS RAB on top of CS RAB and when there is fast fading of the radio conditions during the reconfigurations.

A case of the call drop with the given problem will be analyzed in order to explain the core issue with the current UTRAN implementation in the field.

Mobile station has an active CS RAB and is in CELL_DCH state.

Mobile station is in soft handover with an active set of two cells with PSC A and B respectively.

Mobile station has triggered the Measurement Report with an event ID of 1b for cell B, which means "Primary CPICH of cell B has left the Reporting Range" (FDD only). This may lead to the radio link deletion of cell B from the active set by the UTRAN as the cell B is not good enough.

Prior to the reception of this Measurement report the UTRAN has triggered a radio reconfiguration procedure with an activation time by means of Radio Bearer Reconfiguration message. (The given procedure can also be initiated by sending Transport Channel Reconfiguration or Physical Channel Reconfiguration messages).

When triggering the Radio Bearer Reconfiguration procedure, the UTRAN will lock out the mobility processing for the mobile station by not acting upon the incoming measurement reports or events from the mobile device. This is to ensure that while a change in network behavior propagates to the various network components and mobile device, the various components cannot become out of sync, due to attempting to service mobility at the same time.

During the receipt of the first RLC AMD PDU corresponding to the Radio Bearer Reconfiguration message (in the given case) and the Radio Bearer Reconfiguration complete message, there was a time span of around 1.3 seconds (in this particular case but it is network configuration dependent) and radio conditions have changed significantly during the given time period.

Now, cell B has become a better cell than it was when the mobile station received the reconfiguration message As a result, of the increase in cell B quality the mobile station sends the Measurement Report with event ID of 1d for cell B, which means "change of best cell" (FDD only) and now cell B, is the best cell. The UTRAN may normally be expected to now add the radio link to cell B to the Active Set of the mobile station by sending an Active Set Update with a radio link addition for the associated radio link.

Also cell A has deteriorated significantly resulting in the mobile station sending a Measurement Report with event ID of 1b for cell A, which means "Primary CPICH of cell A has left the Reporting Range" (FDD only). Now the UTRAN may normally be expected to delete cell B from the mobile station's active set by sending an Active Set Update message deleting the associated radio link.

At the Activation time, mobile station sends the Radio Bearer Reconfiguration Complete message.

On receiving the Radio Bearer Reconfiguration Complete message, the UTRAN ends the mobility lockout and starts to act on the Measurement Reports sent by the mobile station during this lock out period. (This action may be either the processing of the measurement reports and sending of the resulting messages or just the sending of resulting messages based on recently processed measurement reports (as received during the lock out period)).

Here, the UTRAN acts on the Measurement Reports in its queue and in sequential order as received (e.g. first in first out) that was sent by the mobile station when the UTRAN went into the mobility lockout. Here specifically the UTRAN acts on the Measurement report sent in step 3 above, with the measurement event ID of 1b for cell B.

The UTRAN now responds to this report by deleting the radio link for cell B by sending an Active Set Update message to the mobile station. However at this time Cell B is now actually the best cell as per the current radio conditions.

This leaves the mobile station with an active set which contains only cell A which is a "bad cell" as per the current radio link conditions and leads to the CALL DROP. The important aspect of this scenario is the fact that mobile station has continually communicated to the UTRAN regarding the current radio conditions by means of Measurement Reports during Radio Bearer Reconfiguration procedure.

The change in the radio conditions of cell A and B during the Radio Bearer Reconfiguration procedure as described above is illustrated in FIG. 2, above, which shows respective cell signal strengths for Cell A and for Cell B as measured by the mobile station. The RBR start and complete dotted line corresponds to the time span for the Radio Bearer Reconfiguration procedure.

FIG. 3 shows the time span between the Measurement Report with event ID of 1*b* for Cell B (marked as "event 1*b* for 254") as sent by the mobile device and Cell B being removed by the Active Set Update (ASU), (marked as "ASU to Remove 254") as sent by the UTRAN. Thus, FIG. 3 shows a timeline for RRC messages sent before, during and after Radio Bearer Reconfiguration.

In the scenario described above, the CS call drop could have been avoided if UTRAN had leveraged the information provided by the mobile station in the Measurement Reports as sent during the radio reconfiguration procedure mobility lock out by the UTRAN. As we understand it, the measurement events are normally treated separately from the measurement reports, and if observed in a timely manner, this would be fine. However, in cases where major latency occurs due to the network mobility lock out, leveraging the content of measurement reports could prevent this deterministic failure mode. This may well apply to other scenarios, but this is the most evident.

In this solution, on returning to the service mobility processing (at the end of Radio Reconfiguration procedure), the UTRAN shall leverage all the pending Measurement Reports sent by the mobile station before and during the Radio Reconfiguration procedure in order to make a single combined composite decision for the radio link addition and or removal for the Active Set of the mobile station. This will enable the UTRAN to make a decision as per the current radio link environment of the mobile station and can greatly help in maintaining the integrity of the ongoing calls. The UTRAN should complete this processing, assessment and decision process and communicate the combined result to the UE as soon as possible after the on going Radio Reconfiguration procedure has been completed.

In another alternative solution, the mobile station will trigger the measurement events as per the required thresholds configured by the network and sends it to the UTRAN before and during the Radio Reconfiguration procedure. At the same time, the mobile station will also send the intra frequency measurement result list for the cells in the current active set within the Reconfiguration Complete message (Radio Bearer Reconfiguration Complete message in the scenario described above). The measurement result list will only include latest CPICH-EcNO and CPICH-RSCP for the cells in the active set. The measurement result list will only be sent in the Reconfiguration complete message when there is some measurement events generated during the reconfiguration procedure (the time, when mobility is locked in the UTRAN). This may act as an indicator to the UTRAN that it should leverage all the pending Measurement Reports sent by the mobile station before and during the Radio Reconfiguration procedure in order to make a single combined composite decision for the radio link addition and or removal for the Active Set of the mobile station as well as providing the most recent radio condition in the fast fading radio environment.

In an alternative approach when measurement events are triggered just prior to and during a Radio reconfiguration procedure the mobile station may keep track of the resulting combined decision of all the successive triggered measurement events. The UE can then process and compile a single resulting Measurement report, predicted Active Set status or other indication, to be sent within the Reconfiguration complete message (Radio Bearer Reconfiguration Complete message in the scenario described above) to the UTRAN for processing.

One way to do this would be to still send the measurement reports on each event trigger but to also keep an ongoing record of the expected composite cell/radio link additions that would be sent by the UTRAN during normal (not during radio reconfiguration procedure) operation.

Alternatively rather than send the measurement reports during an on going reconfiguration procedure the mobile station can store these events and as above compile a combined/predicted measurement report or active set status.

With this approach there is a possibility that a measurement event reported just before the Radio reconfiguration was received will still be acted on by the UTRAN as it was received by the UTRAN after the lock out started. If the UTRAN processes the updated message in the reconfiguration complete it would need to also delete this pending measurement report as this would be surpassed by the resulting composite measurement report or active set prediction from the mobile station.

Two aspects that may be considered with this approach are; Measurement events reported just before the reconfiguration message is received by the UE but after the UTRAN has locked out mobility processing for the mobile station will still need to be handled in a special manner by the UTRAN. That is the UTRAN needs to combine or replace the updated report/indication with this pending measurement event report.

For this to be useful the UTRAN needs to take care in not performing any mobility procedure immediately after the reconfiguration procedure is complete in order to take this enhanced reconfiguration complete message into account. Also, in cases where the UTRAN does not support this behavior (because it is a legacy UTRAN) then the message would be needlessly sent, as the network will not be able to take this into account.

In another alternative rather than send a combined measurement report within the existing reconfiguration complete message an alternative would be to send a measurement report or new predictive Active Set indication, immediately after the reconfiguration complete message. This measurement report or indication would then be a composite message compiled from the measurement reports triggered just prior to (and for which a resulting mobility procedure has not been received) and any measurement reports triggered during the reconfiguration procedure.

In an additional alternative this measurement report or indication message may include an indication that it is a special or emergency measurement report, and should be handled instead of or in combination with the pending measurement reports.

The UTRAN should be able to identify this report as a special or priority report in order to handle as a priority and in replacement for any pending measurements not handled during it's lock out of mobility procedures for that mobile station.

Alternatively the UTRAN knowing that it has pending measurement reports received during the radio reconfiguration can delay processing these reports until it has received the composite measurement report, Active set configuration or further indication from the UE for a short period after the reconfiguration complete message has been received. This short waiting period should be comparable to the time taken to determine a composite measurement report, submit it to lower layers for processing and transmission time to reach the network plus any necessary network decoding and processing time to receive the message.

Another alternative would be to introduce a new message to reject the resulting Active Set Update message which was removing the radio link which is known to be a good radio link currently for the mobile station at the completion of the reconfiguration procedure or is know to be part of the resulting composite Active Set by the mobile station. The reject message can give details of the full resulting composite Active Set or as a minimum an indication of the current best cell, in order to ensure that the ongoing call is not dropped.

As a variation on this approach if the first Active Set Update does not remove a link or result in an action which immediately causes the ongoing call to drop, the mobile station may still wish to send a resulting composite measurement report or indication in the Active Set Update Complete message. In particular this is for when there may be pending measurement reports in the UTRAN which when subsequently received would cause the UTRAN to send an Active Set Update message ultimately resulting in the removal of radio links known to be good for the mobile station after the completion of the reconfiguration procedure, or only leaving radio links in the Active Set which the UE can no longer utilize to maintain the on going call.

In another variation of this approach the existing Active Set Failure message could be enhanced to send this resulting composite measurement report or indication in response to an Active Set Update message.

Another alternative would be for the UE to temporarily ignore any Active Set Update message which removed a radio link from the Active Set until all the pending Measurement reports are treated. If a subsequent Active Set Update message added the radio link back in then the UE could ignore the pending removal action.

A problem with this approach might be that the UTRAN would for some period of time between the Active Set Update messages think that the UE has stopped using that specific radio link and not send data to the UE via it. If this is the only Radio Link left in the mobile stations Active Set then the mobile station will not receive the subsequent Active Set Update message adding the radio link back in.

Another alternative is to use 'event triggered periodic measurement reporting' for the event 1b measurement report. 'Event triggered periodic measurement reporting' is already defined in the 3GPP specification 25.331. If it is configured by the network then the UE will trigger a first measurement report when the conditions for event 1b are met for a certain radio link (i.e. the quality of the radio link degrades so that it leaves the reporting range). After the configured reporting interval (for example, after 500 ms or 1 s) the UE will send another measurement report to again inform the network that the event 1b has occurred. This period resending of the measurement report continues until A) the maximum number or reports has been send; B) the radio link is removed from the active set by the network sending an Active Set Update (ASU) message; or C) the quality of the radio link improves such that the conditions that triggering the first measurement report are no longer met.

One or more aspects of a solution to the above problem would be:

A) The network configures the UE to use event 1b with 'event triggered period measurement reporting' as described above.

B) Any measurement report indicating an event 1b (or in the general case any measurement event configured with 'event triggered period measurement reporting') that is received by the network while a reconfiguration procedure is ongoing and the mobility is locked out for the mobile station is discarded and not acted upon (rather than the approach used today in which all measurement reports are queued and acted upon in reception order after the end of the reconfiguration).

Note that measurement reports indicating other events could still be queued and acted upon immediately after the reconfiguration procedure.

C) After the reconfiguration procedure is complete, any measurement report indicating an event 1b that is received by the network will be acted upon in the normal way (i.e. by sending an ASU message to remove the radio link).

With elements described above, when a radio link degrades in quality during an ongoing reconfiguration procedure then a measurement report for event 1b will be triggered. This would be discarded by the network and thus not acted upon immediately after the completion of the reconfiguration procedure. Two situations can occur depending on whether the radio link remains bad or improves in quality during the ongoing reconfiguration procedure.

Ci) If the radio link remains poor quality after the reconfiguration procedure is completed then the UE will send another measurement report indicating event 1b to the network, and the network will respond by removing the radio link. The radio link removal will be delayed compared to the existing network behavior which would act on the queued message immediately after the reconfiguration procedure is complete, but in the case of radio link removal such a delay is not a concern.

Cii) If the radio link improved in quality during the reconfiguration procedure then the event triggered period reporting will be cancelled. The UE will not send any further measurement reports indicating event 1b after the reconfiguration procedure is complete and so the network will not remove the radio link from the active set, and as a consequence this will avoid the call drop that would occur with the existing network behavior.

Some variants to the solution, but achieving a similar result, are also possible. For example, the network could queue the periodic measurement reports receive during an ongoing reconfiguration procedure and act on them in sequence after the completion of the reconfiguration procedure (i.e. as done with existing network behavior). However, when processing the queued measurement reports the network would look at the time when the measurement report indicating an event 1b was received. If greater than a certain time has elapsed since the report was received (e.g. >200 ms) then the network discards the measurement report indicating the event 1b as it is considered out of date. If the radio link remains poor then the UE will send another measurement report after the reporting interval and the radio link can then be removed. If the radio link quality improves the UE will not send any further measurement report for event 1b and the radio link will not be removed.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A user equipment (UE), comprising:
a component configured to:
update a combined cell measurement report by replacing an outdated cell measurement with an updated cell measurement made contemporaneous with a radio reconfiguration;
send a radio bearer reconfiguration complete message to the network; and
subsequently send a separate message comprising the combined cell measurement report updated during the radio reconfiguration, the updated combined cell measurement report used to update an active set (AS) of cells.

2. The UE of claim 1, wherein the updated combined cell measurement report is processed by the network in communication with the UE to update the AS cells for the UE.

3. The UE of claim 2, wherein the network is a Universal Mobile Telecommunications System (UMTS) terrestrial Radio Access Network (UTRAN).

4. The UE of claim 2, wherein the updated combined cell measurement report indicates current updated radio conditions.

5. The UE of claim 2, wherein the network does not update the AS cells during reconfiguration.

6. A method of wireless communication, comprising:
receiving, by a user equipment (UE), a radio bearer reconfiguration message indicating a radio bearer reconfiguration;
obtaining, by the UE, a plurality of cell measurement reports during the radio bearer reconfiguration;
combining, by the UE, during the radio bearer reconfiguration, the plurality of cell measurement reports to create a combined cell measurement report;
updating, by the UE, during the radio bearer reconfiguration, the combined cell measurement report by replacing an outdated cell measurement with an updated cell measurement made contemporaneous with the radio bearer reconfiguration;
sending a radio bearer reconfiguration complete message to the network; and
subsequently sending, by the UE, a separate message comprising the combined cell measurement report updated during the radio bearer reconfiguration, the updated combined cell measurement report used to update an active set (AS) of cells.

7. The method of claim 6 further comprising sending, by the UE briefly before the radio bearer configuration, the cell measurement reports in sequence upon detecting corresponding cell events briefly before the radio bearer reconfiguration.

8. The method of claim 7, wherein at least some of the outdated cell measurement reports correspond to cell events briefly before the radio bearer reconfiguration.

9. The method of claim 7, wherein the cell measurement reports are stored in sequence during the radio bearer reconfiguration.

10. The method of claim 6, wherein updating the combined cell measurement report comprises updating the combined cell measurement report upon each obtained cell measurement report.

11. The method of claim 6, wherein the updated combined cell measurement report is sent by the UE to a network to update a plurality of active set (AS) cells for a user agent (UA).

12. The method of claim 6 wherein the updated combined cell measurement report is configured to be used by a network for selecting a plurality of updated active set (AS) cells.

13. The method of claim 6, wherein the updated combined cell measurement report is sent by the UE using a predictive active set (AS) indication in the separate message.

14. A method of wireless communication, comprising:
obtaining, by a user equipment (UE), a plurality of cell measurement reports during a radio bearer reconfiguration;
combining, by the UE, during the radio bearer reconfiguration, the plurality of cell measurement reports to create a combined cell measurement report;
updating, by the UE, during a radio bearer reconfiguration, a combined cell measurement report by replacing an outdated cell measurement with an updated cell measurement made contemporaneous with the radio reconfiguration;
receiving, by the UE, a plurality of active set (AS) cells in an active set (AS) update message after completion of the radio bearer reconfiguration; and
rejecting, by the UE, at least one AS cell of the plurality of AS cells in the received AS update message, the rejecting based on the updated combined cell measurement report.

15. The method of claim 14, wherein the AS cell is rejected by the UE sending a reject message.

16. The method of claim 15, wherein the reject message indicates a plurality of updated AS cells or at least one updated AS cell.

17. The method of claim 15, wherein the reject message comprises a plurality of updated cell measurements.

18. The method of claim 14, wherein the AS cell is rejected if the AS cell has a signal strength below a threshold.

19. The method of claim 18, wherein the threshold is specified using a broadcast system information or Radio Resource Control (RRC) signaling.

20. The method of claim 14, wherein the AS cell is rejected by sending a AS update failure message.

* * * * *